May 6, 1930.	G. C. BEIDLER	1,757,001
PHOTOGRAPHIC APPARATUS
Filed April 4, 1924	6 Sheets-Sheet 1

Inventor,
George C Beidler,
G Frank A. Appleman,
Attorney.

May 6, 1930. G. C. BEIDLER 1,757,001
PHOTOGRAPHIC APPARATUS
Filed April 4, 1924 6 Sheets-Sheet 2

Inventor,
George C Beidler,
By Frank S. Appleman,
Attorney.

May 6, 1930.                G. C. BEIDLER                1,757,001
                          PHOTOGRAPHIC APPARATUS
                    Filed April 4, 1924      6 Sheets-Sheet 3

May 6, 1930.   G. C. BEIDLER   1,757,001
PHOTOGRAPHIC APPARATUS
Filed April 4, 1924   6 Sheets-Sheet 4

Inventor,
George C Beidler,
By Frank S. Appleman,
Attorney

May 6, 1930.  G. C. BEIDLER  1,757,001
PHOTOGRAPHIC APPARATUS
Filed April 4, 1924    6 Sheets-Sheet 5

Inventor,
George C Beidler
By Frank S. Ackerman,
Attorney.

May 6, 1930.     G. C. BEIDLER     1,757,001
PHOTOGRAPHIC APPARATUS
Filed April 4, 1924    6 Sheets-Sheet 6

Inventor,
George C Beidler,
G Frank S. Appleman,
Attorney.

Patented May 6, 1930

1,757,001

UNITED STATES PATENT OFFICE

GEORGE C. BEIDLER, OF ROCHESTER, NEW YORK

PHOTOGRAPHIC APPARATUS

Application filed April 4, 1924. Serial No. 704,275.

This invention relates to photography and particularly to a camera or device for exposing film to actinic light as is usually done in the making of pictures on sensitized elements, and the invention has reference particularly to a camera to be used in photography in connection with so-called "duplex" films, recognized by those skilled in the art as a film having a sensitized coating on its two sides in order that both sides of the film may contain an image produced through the exposure of the film to actinic light and its proper development according to the usage of photography.

One of the important results of an invention of this character is the facility with which pages of books can be produced, with each side of the page containing a photograph or image. Pages or photographs so made can be bound into volumes, and the invention can be advantageously used in the reproduction or copying of public records, or in the production of public records such as the recording of deeds, mortagages and the like by the photographic process, instead of requiring the records to be made through copying the instruments by manuscript, typewriter or the like.

The invention of this application has for a further object the provision of means whereby a film may be held in a plane to be exposed to light, and in photography the correct position of the film to receive a photographic image is referred to as the focal plane of the camera, or the lens by which the image is projected. While those skilled in the art will understand the objects, it may be stated that it is the purpose of the inventor to hold film in a focal plane preferably by a means that does not cover either side of the film, but leaves a view of the film unobstructed on each side in order that each side of the film may be exposed to light.

It is a further object of this invention to associate a film holding means and a camera with mechanical means for changing the positions of the parts whereby the two sides of the film will successively be subjected to action of the light admitting element or part of the camera, due to movement of the film holding means and light admitting means with relation to each other.

It is a further object of this invention in its more restricted form to produce a film holding means capable of holding the film in the focal plane and in so mounting the film holding means as to permit its movement while in the camera to present the sides of the film alternately to the light admitting means of the camera; and it is furthermore an object of this invention to associate with the said film holding means a source of film supply from which film may be drawn to and preferably across the film holding means, a mechanically operated film drawing means whereby film is drawn from the film supply, as well as a film cutting or severing device in order that film holding, drawing and cutting instrumentalities may be contained within the camera and operative as a unit in order that film may be held for exposure, thereafter drawn from the exposed area, and that the exposed area may be severed from a web of film issuing from the source of supply.

It is furthermore an object to produce these instrumentalities in association with a holder capable of being reversed as to its position relative to the light admitting means, in order that the two sides of the film may be exposed successively, while the mechanically operated means for drawing the film and severing it are movably maintained for operative engagement with the source of power designed for their operation.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Fgure 6 illustrates a view in front elevation thereof.

In these drawings, a conventionl form of photographing apparatus is shown, but a description of the details thereof is believed unnecessary, except to refer to the parts with which the film holder is associated.

In the photographing apparatus illustrated, a film drawing crank 20 is located outside of the casing on a shaft 21 and it extends through the casing and is provided at its inner end with a gear wheel 22 that operates a train of gearing, one gear wheel 23 of which meshes with a gear wheel on the shaft 22ᵇ which rotates the indicator 22ª. The gear wheel 22 meshes with a gear wheel 25 on the shaft of one of the drawing rollers identified by the reference character 24ª. The shaft of the drawing roller also has a gear wheel 24ᵇ secured on it that meshes with a gear wheel 24ᶜ on the shaft of a coacting drawing roller 25ª. When the film carrier to be hereinafter described is moved or rotated to change the position of the film, the gear wheel 25 is carried from engagement with the gear wheel 22 during the time the exposure is made on the reverse side of the film, but is returned into engagement with it when the film holder is in its normal position in order that the crank may be manually operated to rotate the drawing rollers, an operation which results in drawing film through the case 26 which encloses the exposing chamber.

Film is subjected to the action of actinic rays of light in the exposing chamber, in the present instance, through the use of conventional forms of light projecting features which may include a lens, bellows and other arrangements used in the photographic art.

The exterior of the apparatus may be also provided with a crank 27 on the shaft 28 extending through the casing, which shaft has a segmental gear 29 mounted on its inner end and operative to actuate film cutting means, as will presently appear. The segment 29 is associated with an arm 30 having a curved guide 31 extending from its end and the segment is retracted against the action of the manually operated crank by a spring 32 which serves to return the cutting device to its normal position after it has been manually actuated to sever film.

An opening is produced in the top of the casing 26 and a ring 33 is seated therein, the said ring having a bearing flange 34 with a race 35 therein for the anti-friction elements 36 such as balls. The anti-friction elements support a bearing ring 36ª that is secured to a head 37 by fastenings 37ª such as screws or the like, and by this means the head or top plate 37 of the film holder of this invention is rotatively supported in the casing. The bearing ring 36ª has a peripheral slot 36ᵇ into which one or more retaining pins or lugs 36ᶜ may project, it being shown as here illustrated, that each of said pins 36ᶜ may be carried by a screw 36ᵈ secured in the ring 33.

The head has a slot 38 through which film may be drawn to the interior of the exposing chamber, and the film may be guided by a roller 39. The head is further provided with beads 40 arranged in rectangular formation, the said beads being employed as guides and they form shoulders that are engaged by a magazine cover 41, the said cover being held in place by suitable latches 42. In this device, a spool 43, which may contain a supply of film in the form of a web which is wound on the spool, is removably applied to the spool supporting brackets 44 which are carried by the head 37, and the film 45 wound from said spool is led through the slot and downwardly through the exposing chamber between the film drawing rollers, from whence it may be directed to any suitable receptacle for storage or development.

The film holding means which is rotatively mounted in the casing together with the magazine includes, or has associated with it, in the present embodiment of the invention, a film cutting means which, with the film drawing means is mounted to move with the film holding means with relation to the gearing or the manually operated elements for actuating the film drawing means and the film cutting means.

The film carrier includes the head 37 that carries depending cheek pieces 46, which cheek pieces preferably at their lower ends have mountings for the cutting apparatus and film drawing rollers. In this embodiment of the invention, plates 47 are provided, one plate is applied to each cheek piece at its lower end, and each plate has an inwardly extending flange 48 below the lower end of the cheek piece to form a clearance in which a rack 49 is slidable. Each rack has an extension that is connected to a blade 50 by a fastening 51 such as a rivet or the like, in order that the blade 50 may be moved into operative relation to the blade 52 which is preferably stationary. The stationary blade 52 is located below the drawing rollers, and film that has been actuated by the drawing rollers will be forced between the two blades in order that when the movable blade is operated to cause its cutting edge to pass the cutting edge of the blade 52, the film will be cut. Preferably the blade 50 is set diagonally with respect to the cutting edge of the blade 52 in order that a draw cut may be produced when the blade is actuated, since such action will increase the efficiency of the cutter.

A shaft 53 is journaled in the two plates 47 and projects beyond a plate on one side of the carrier. Toothed segments 54 are secured on the shaft 53 just at the inner surfaces of the plates and these segments each engage a rack 49 and are operative to move the racks for the purpose of actuating the blade 50. The end of the shaft which projects beyond one of the plates 47 has a toothed segment 55 secured on it and this segment 55 is intended to be moved into and out of engagement with the segment 29 in order that the shaft 53 will have rotary motion imparted to it when the crank 27 is manipulated to partially rotate the shaft 28. It is seen that the shaft 53 projects beyond the segment 55 to a limited extent, and it is the purpose of the inventor that the curved extension 31 of the arm 30 shall engage the extended end of the shaft during the operation of the segments, as this relation of parts will serve to prevent springing of the shafts or disengagement of the teeth of the segments. The radius of the extension 31 is, of course, equal to the distance between the shaft 28 and the shaft 53 in order that the said extension will bear against the shaft 53 while the parts are moving. The gear wheel 25 will likewise be carried into and out of engagement with the pinion 22 and the film carrier will be rotatively supported, but so held as to cause the re-engagement of the gear wheels and segments when the holder has been returned to its initial position.

A pin or stud 56 projects upwardly from the top of the casing near one side, and a pin or stud 17 projects upwardly from the casing opposite the position of the pin or stud 56. A substantially triangular plate 58 is secured on the bearing ring and its two edges 59 and 60 form abutments for studs 61 and 62, respectively, that depend from the under surface of a latch 63, which latch has seats or recesses 64 and 65 to receive the respective pins or studs. The latch 63 is oscillative on a pivot 66 and it has a handle 67 which may be grasped by an operator for manipulating the latch and for applying power for turning the film holder.

Figure 1:
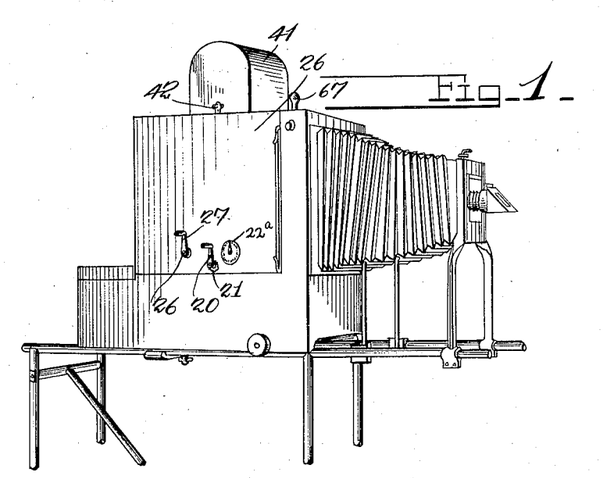
Figure 1 illustrates a view in perspective of a photographic apparatus in which the invention is embodied.
Figure 2:
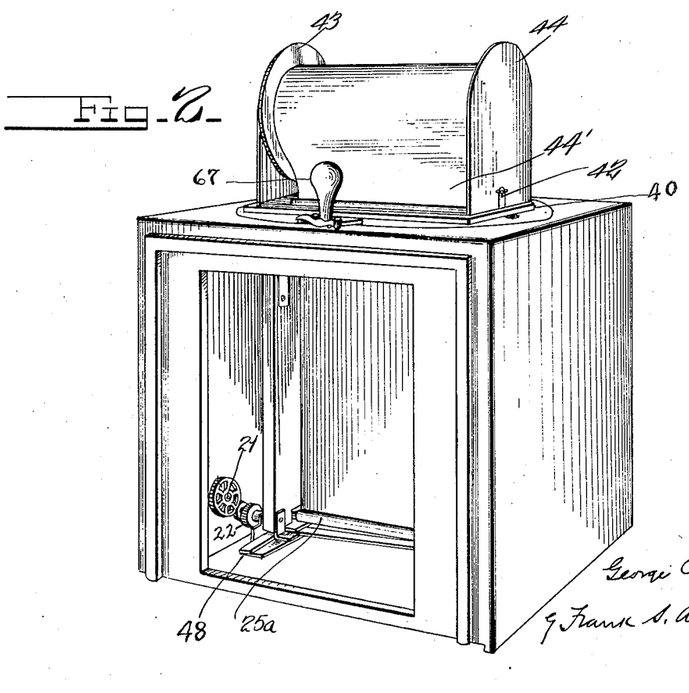
Figure 2 illustrates a perspective view of a film holder and parts associated with it.
Figure 3:
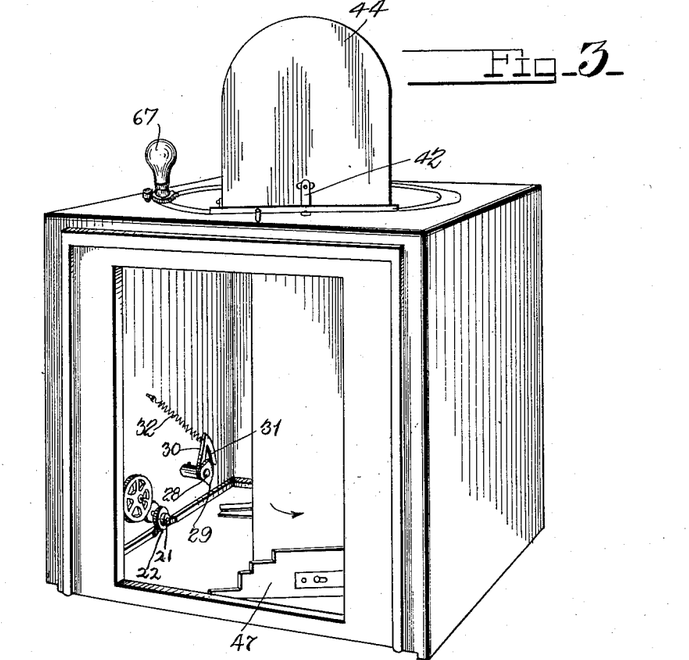
Figure 3 illustrates a perspective view of the same device with parts in different positions of adjustment.
Figure 4:
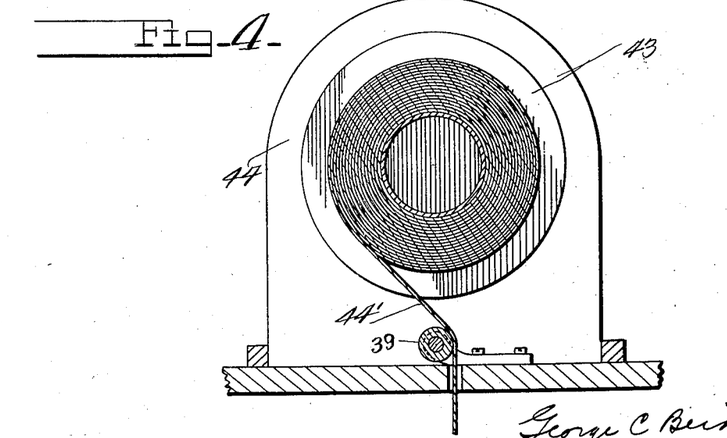
Figure 4 illustrates a sectional view through a magazine for holding a supply of film and the head of the film holder.
Figure 5:
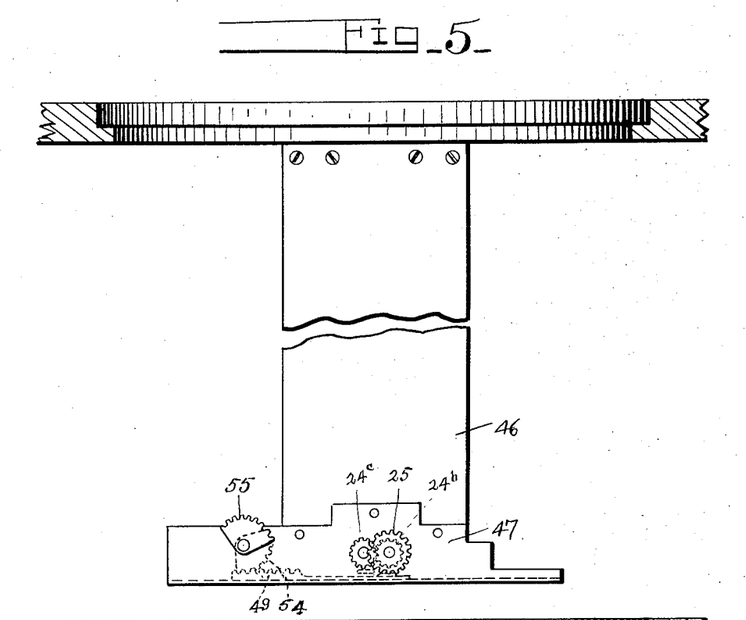
Figure 5 illustrates a side elevation of the film holder.
Figure 6:
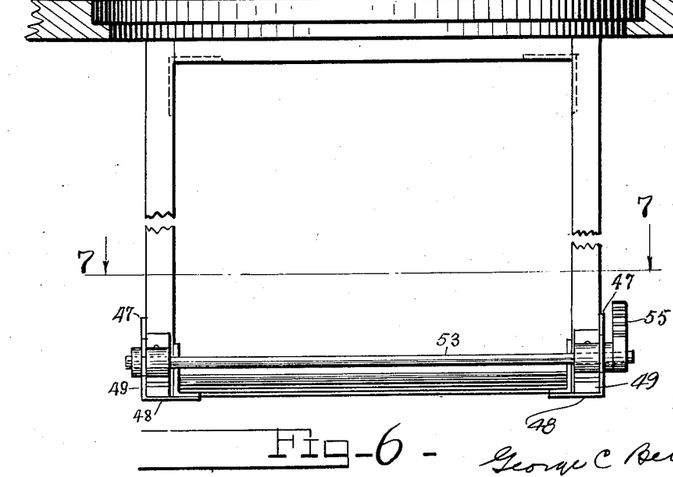
Figure 7:
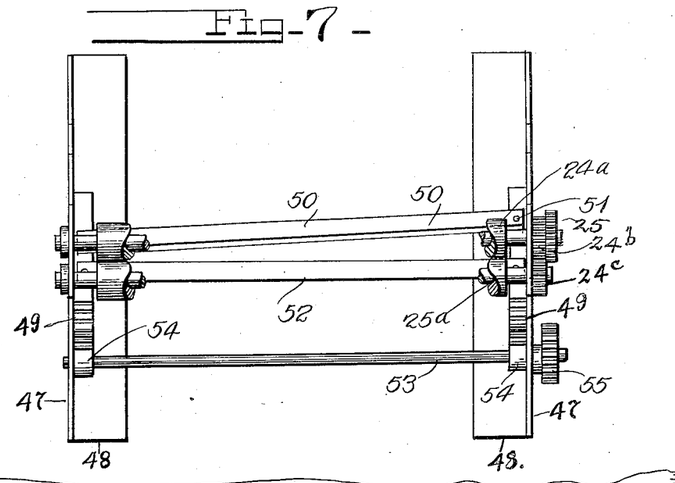
Figure 7 illustrates a sectional view on the line 7—7 of Fig. 6.
Figure 8:
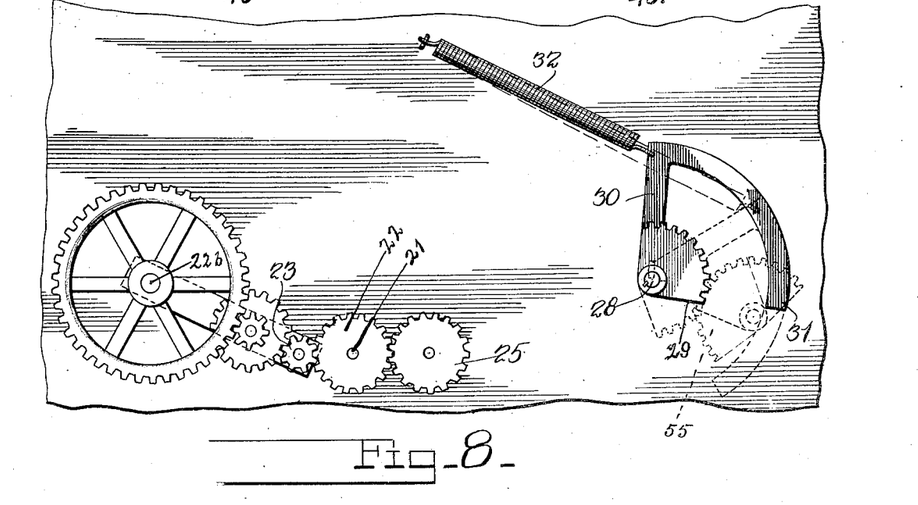
Figure 8 illustrates a view in elevation of a fragment of the interior of the camera or casing and parts associated with the mechanism.
Figure 9:
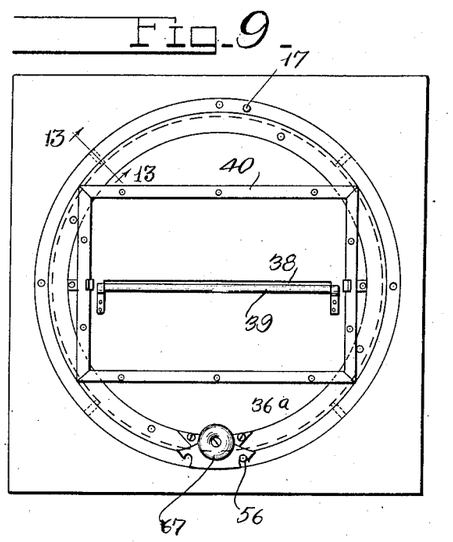
Figure 9 illustrates a plan view of the top of the camera and the film holder with the magazine removed.
Figure 10:
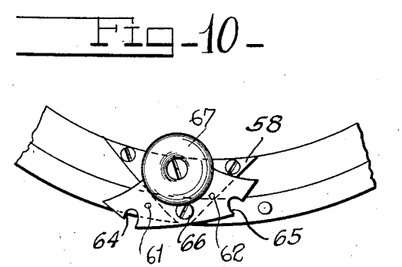
Figure 10 illustrates a plan view of the film holding latch located at one side of the casing.
Figure 11:
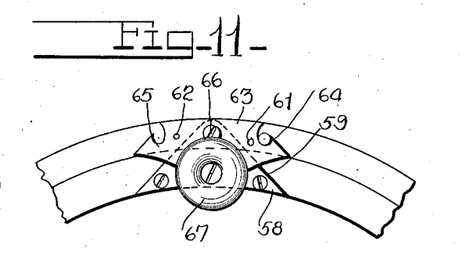
Figure 11 illustrates a similar view of the latch when on the opposite side of the casing.
Figure 12:
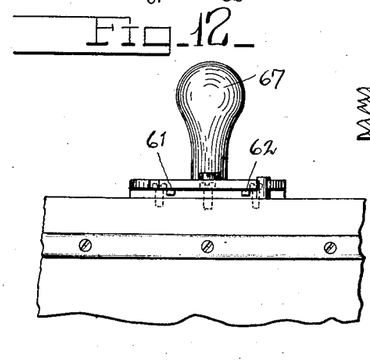
Figure 12 illustrates a view in elevation of the magazine retaining latch.
Figure 13:
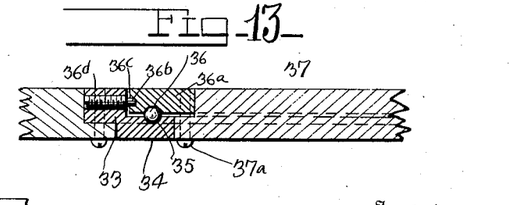
Figure 13 illustrates a sectional view on the line 13—13 of Fig. 9.
Figure 14:
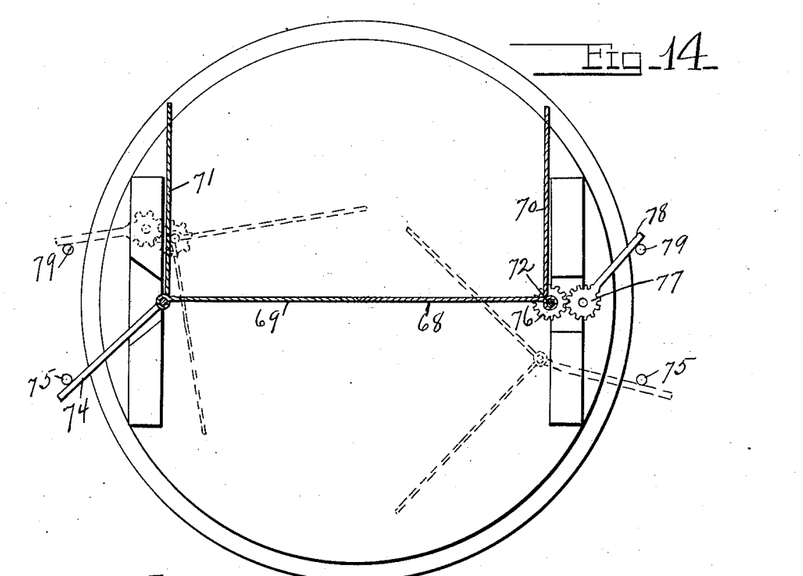
Figure 14 illustrates a detail view showing the mounting and means for operating the film screens.
Figures 15, 16:
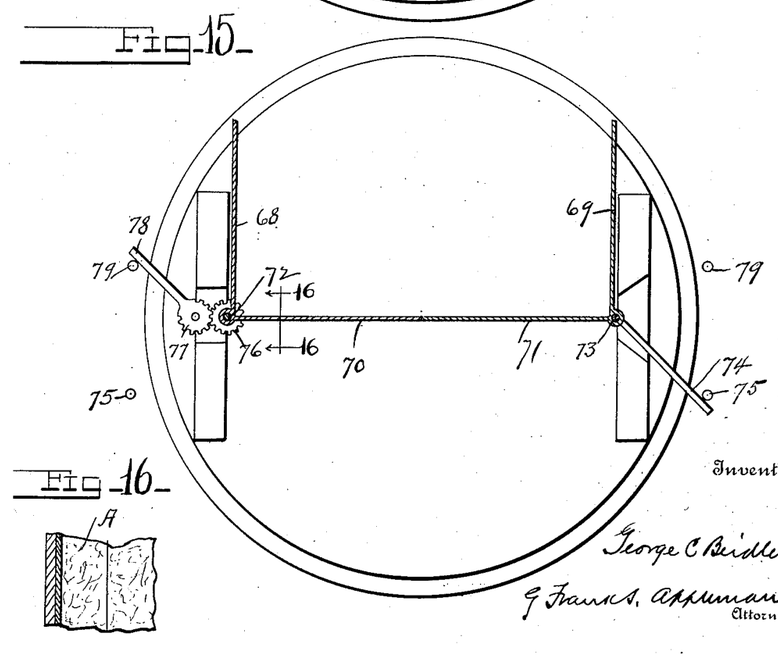
Figure 15 illustrates a similar view showing the position of the screens when the film holder has been turned half way around.
Figure 16 illustrates a fragment of a screen.

After a film has been drawn through the film holder or across it, when the film holder is in its initial or normal position as shown in Fig. 2, the side of the film which is seen illustrated in Fig. 2 may be exposed to light, and thereafter an operator may manipulate the handle 67 to disengage the latch from the pin or stud, and by pressure on the said handle, impart rotary motion to the film holder until it is turned half way around, at which position the surface of the film opposite that seen in Fig. 2 will occupy the position now occupied by the side of the film shown in Fig. 2. The opposite side of the film may then be exposed to light, and by reversal of operation of the handle, the film holder will be restored to its initial position as shown in Fig. 2, in which position the gear wheel 25 will be in mesh with the gear wheel 22 and the teeth of the segments 29 and 55 will also be in mesh. The latch will serve to retain the parts in this initial position during the manipulation of the crank 20 for drawing the exposed portion of the film from the exposing chamber and during the operation of the crank 27 for actuating the cutter to sever that portion of the film which has been exposed from the web of film remaining in the camera. This operation may be repeated in order to produce photographs on two sensitized sides of a coated element.

It has been found that when a film is used having two of its sides sensitized, the light directed to one side has an effect on the sensitized surface of the other side, varying to a greater or lesser degree, depending upon conditions. It is the purpose of the inventor to modify or neutralize the action just mentioned, and to that end, he has provided means for absorbing the ray of light or the diffused light which affects the film. One means for accomplishing the result has been found to consist in applying opaque backgrounds in approximate contact with the two sides of the film which, according to the theory so far determined, absorbs the light and prevents to a great extent its acting on the coated surface opposite that being exposed.

To the end just stated, two shutters or screens are provided on each side of the area occupied by the film, the said screens being provided with operating means by which the film is uncovered when in position to be exposed to light and covered on that side which is not being exposed to light. In the embodiment of this particular part of the invention as here shown, the screens 68 and 69 are each mounted on one side and the screens 70 and 71 on the other side of the film are carried by shafts or pintles 72 and 73, the screens 68 and 70 being carried by the pintle 72 and the screens 69 and 71 being carried by the pintle 73. The pintle 73 has an arm 74 extending outwardly toward the inner surface of the casing and the casing is provided with tripping pins 75 against which the arm contacts so that as the film holder is rotated, the arm is arrested and serves to turn the pintle to change the positions of the screens during the movement of the said film holder. The other pintle 72 is actuated by toothed members 76 and 77, one of which is secured on the pintle and the other of which is rotatively mounted and provided with an arm 78 that engages trips 79 projecting from the inner surface of the casing, and when the film holder is turned, the last mentioned arm comes in contact with an arm arresting device, and as the rotation of the film holder proceeds, the pintle carrying the screens is rotated to change the positions of the said screens. It will be seen that the arrangement of parts is such that the screens uncover the side of the film which is in position to be exposed to light and cover the opposite side alternately.

The term "film" as employed in this specification is intended to refer to any element of a flexible nature capable of supporting and carrying a sensitized coating. Usually, the films used in machines of this character are made by coating both sides of paper with a sensitive emulsion, but celluloid or other material may be employed as a web or support for the emulsion.

The screens are preferably faced with a light absorbing material A such as felt or the like.

As contemplated by the inventor, when the film is in the exposing chamber and one side of the film has been exposed to light, relative movement of the film holder and the means for exposing the film to light may take place while the film holder is in the exposing chamber of the photographic apparatus, for positioning the parts so that the side of the film opposite that first exposed may be subjected to the action of the light admitting means, or as is commonly termed "exposed", and, of course, the invention contemplates that the two sensitized sides of the same length of film or same film may be exposed.

I claim:

1. In a camera having an exposing chamber and light admitting means, a film holder rotatively mounted in the camera in position to expose the sides of the film successively to light, means for retaining the film holder in its adjusted positions, film drawing means and film cutting means carried by the holder, manually operated means externally of the camera connected to actuate the film drawing means, and manually operated means externally of the camera operative to actuate the film cutting means.

2. In a camera having an exposing chamber and light admitting means, a film holder rotatively mounted in the camera and operative to present the alternate sides of the film to light successively, film drawing means and film severing means associated and movable with the film holder, gearing for operating the film drawing means, gearing for operating the film severing means, means exteriorly of the camera connected to and operative to actuate the first mentioned gearing, and means exteriorly of the camera connected to and operative to actuate the second mentioned gearing.

3. In a camera having an exposing chamber and light admitting means therefor, a film holder rotatively mounted in the camera in position to expose the sides of the film successively to light, film drawing means, film severing means, means for actuating the severing means associated with and carried by the film holder, manually operated means for driving the film drawing means located in stationary position with respect to the exposing chamber with relation to which the film driving means of the film drawing means is movable, a manually operated device in stationary position with relation to the exposing chamber for operating the severing means with relation to which the exposing chamber is movable, screens mounted to cover the sides of the film, and means whereby the screens alternately cover and uncover the sides of the film.

4. In a camera having an exposing chamber and light admitting means, a film holder rotatively mounted in the camera and operative to present two sides of film to light successively, film drawing means and film severing means associated and movable with the film holder, and operative means stationed in locations with relation to which the film holder is movable for imparting motion to the film drawing means and film severing means when the said film holder is in a predetermined position.

5. In a camera, having an exposing chamber and light admitting means therefor, a film holder rotatively mounted in the camera in position to expose the sides of the film successively to light, film drawing means associated with the film holder and operative to draw film therethrough, means for actuating the film drawing means when the film holder is in a predetermined position, film severing means associated with the film holder, and means for imparting motion to the film severing means when the film holder is in a predetermined position.

6. In a camera having a chamber and light admitting means, a film holder mounted in the chamber for movement to present the surfaces of the two sides of the same length of film successively to light, film drawing means mounted on the holder to move with it, and mechanical means in fixed location in the path of travel of a part of the film drawing means for operating the film drawing means into and out of operative relation with which the film drawing means is carried as the film holder is moved.

7. In a camera having a chamber and light admitting means, a film holder mounted in the chamber for movement to present the surfaces of the two sides of the same length of film successively to light, film drawing means mounted on the holder to move with it, manually operated means in fixed location into and out of operative relation with which the film drawing means is carried with the film holder, film cutting means movable with the film holder, and means in fixed location into and out of operative relation with which the film cutting means is moved with the film holder.

8. In a photographic copying machine, the combination of means rotative to successively position the opposite sides of a sheet of photographic material for exposure, means for setting and holding the sheet positioning means in its operative positions, and means for tripping said setting and holding means to release the sheet positioning means and thus permit the latter to rotate, thereby reversing the position of the photographic sheet.

9. In a photographic copying machine, the combination of a turntable, means carried thereby for holding a sheet of photographic material in exposing position, and means releasable to permit rotation of the turntable and capable of acting automatically to stop and set the turntable when the latter has rotated to an extent which will bring a sensitized surface of the sheet into exposing position.

10. In a photographic copying machine, the combination of a turntable, means carried thereby for holding a sheet of photographic material in exposing position, and means operative automatically to set and hold the turntable when it reaches a predetermined position in its rotation and to thus set the sheet in exposing position.

11. In a photographic copying machine, the combination of a turntable, means carried thereby for holding a sheet of photographic material in exposing position, and a latch operative automatically to lock the turntable when the latter reaches a point in its rotation where a surface of the sheet is in exposing position.

GEORGE C. BEIDLER.